(12) United States Patent
Sinnhuber

(10) Patent No.: US 6,308,983 B1
(45) Date of Patent: Oct. 30, 2001

(54) SAFETY DEVICE FOR A MOTOR VEHICLE WITH A MULTI-CHAMBER AIRBAG

(75) Inventor: Ruprecht Sinnhuber, Gifhorn (DE)

(73) Assignee: Volkswagon AG, Wolfburg/Fallersleben (DE)

( * ) Notice: Subject to any disclaimer, the term of this patent is extended or adjusted under 35 U.S.C. 154(b) by 0 days.

(21) Appl. No.: 09/673,075

(22) PCT Filed: Mar. 15, 1999

(86) PCT No.: PCT/EP99/01677

§ 371 Date: Oct. 6, 2000

§ 102(e) Date: Oct. 6, 2000

(87) PCT Pub. No.: WO99/52744

PCT Pub. Date: Oct. 21, 1999

(30) Foreign Application Priority Data

Apr. 9, 1998  (DE) ................................................ 198 16 075

(51) Int. Cl.[7] ........................... B60R 21/32; B60R 21/28; B60R 21/16
(52) U.S. Cl. ........................ 280/735; 280/742; 280/743.1
(58) Field of Search .................................. 280/729, 732, 280/736, 739, 742, 743.2, 735, 743.1

(56) References Cited

U.S. PATENT DOCUMENTS

| 3,768,830 | * | 10/1973 | Hass | ............................... 280/150 AB |
| 5,762,367 | | 6/1998 | Wolanin. | |
| 5,957,490 | * | 9/1999 | Sinnhuber | ............................. 280/735 |

FOREIGN PATENT DOCUMENTS

| 40 41 049 | | 7/1992 | (DE). | |
| 0 812 741 | | 12/1997 | (EP). | |
| 0 836 971 | | 4/1998 | (EP). | |
| 2 289 653 | | 11/1995 | (GB). | |
| 1-132444-A | * | 5/1989 | (JP) | ............................. B60R/21/24 |
| 02 286448 | | 11/1990 | (JP). | |
| 98/26960 | | 6/1998 | (WO). | |

* cited by examiner

Primary Examiner—Brian L. Johnson
Assistant Examiner—Joselynn Y. Sliteris
(74) Attorney, Agent, or Firm—Kenyon & Kenyon

(57) ABSTRACT

A safety device for a motor vehicle includes a multi-chamber airbag, which is inflatable by at least one gas generator activatable when a vehicle is impacted. The airbag includes at least one feeler, or tactile, airbag, which may be quickly inflated using only a small quantity of energy and which is provided with a touch, or tactile, function. The feeler airbag may be inflated and introduced into an inflation area of at least one second airbag chamber and identifies, by touch, an obstacle in the inflation area, such as an out-of-position occupant. A touch recognition device is connected to the feeler airbag and emits a control signal, which is utilized at least during the inflation phase. The gas generator includes a control device for the inflowing amount of gas, the control device being connected to the touch recognition device and preventing, or at least reducing, a further inflation function of the gas generator when receiving the control signal.

8 Claims, 3 Drawing Sheets

SAFETY DEVICE FOR A MOTOR VEHICLE WITH A MULTI-CHAMBER AIRBAG

FIELD OF THE INVENTION

The invention relates to a safety device for a motor vehicle with a multi-chamber airbag.

BACKGROUND INFORMATION

Safety devices for a motor vehicle with a multi-chamber airbag are known in various embodiments and various arrangements. In particular, airbag arrangements in the occupants' front, side, and head impact regions are known. Each of these airbags is inflatable in the event of a vehicle collision, as a function of the collision deceleration and direction, by way of an associated activatable gas generator, in order to intercept an occupant's impact in damped fashion.

One problem with these arrangements is that an inflating airbag can exhibit disadvantageous aggressiveness toward occupants or objects in the inflation region. These problems occur in particular with occupants who are outside of a normal position (out of position), for example, in the case of a child who is standing in front of a seat or an adult who is leaning far forward in a seat, and objects on a seat, for example a child seat attached thereon.

Measurement arrangements are known for detecting such out-of-position situations upon activation of an airbag and optionally preventing an airbag from firing or causing it to do so in reduced fashion. Known in particular for this purpose are distance measurement arrangements operating in non-contact fashion with infrared and/or ultrasonic sensors and weight sensors. These arrangements are complex and expensive.

A safety device is described in, for example, European Patent Application No. 0 812 741. In this safety device, a sensing medium is associated with a front part of the airbag, which is configured as a gas bag. The medium is configured to participate in the advance movement of the airbag. An analysis device is provided for determining the advance velocity of the sensing medium and, therefore, of the airbag moving into the passenger compartment. The advance distance and/or the advance times detected by the analysis device may be used to influence the filling behavior of the airbag to thereby reduce the gas volume or suppress gas delivery. A similar operating mechanism is described in European Patent Application No. 0 836 971.

It is an object of the present invention to develop a safety device for a motor vehicle with a multi-chamber airbag in such a way that its aggressiveness is reduced with a simple and directly acting system for recognizing an out-of-position situation.

SUMMARY

A multi-chamber airbag has at least one relatively low-volume finger-like feeler airbag, rapidly inflatable with little energy and having a tactile function, which is inflatable and/or movable into the inflation region of at least one further, larger-volume airbag chamber having a support function and senses any obstacle possibly present in that region, in particular an out-of-position occupant or possibly an object. Connected to or integrated into the feeler airbag is a device for tactile recognition that, when the feeler airbag makes contact, emits a control signal that can be analyzed at least during the airbag inflation phase. The occurrence of such a control signal indicates that an impermissible obstacle, such as an out-of-position occupant or an object, is present in the inflation region of the airbag in which the airbag is intended to deploy in unimpeded fashion.

The gas generator is equipped with a control device connected to the tactile recognition system for the gas volume flowing into the multi-chamber airbag. When the control device receives the control signal, a further inflation function of the gas generator for the multi-chamber airbag is suppressed or at least reduced.

A feeler airbag directly scans the inflation region of an airbag. The relatively small-volume feeler airbag, quickly inflatable with little energy, results in practically no aggression or only a low, acceptable level thereof. If no critical obstacle is sensed in the predefined tactile region, deployment of the remainder of the airbag contour having the supporting function for the associated occupants follows immediately thereafter. If, on the other hand, a critical obstacle is sensed in the predefined scanning region, the aggressiveness of the arrangement is eliminated or at least greatly reduced by remaining airbag contour being not inflated or being inflated to only a reduced extent.

A feeler airbag, or multiple feeler airbags propagating in different directions, can be used for any airbag arrangement, in particular for front, side, and head airbags, in order to sense an unoccupied airbag deployment area.

In a first embodiment, a completely separate chamber of a multi-chamber airbag is configured as a feeler airbag, and the feeler airbag is inflated earlier in time than at least one further airbag chamber having a support function. One or more such feeler airbags can then each be associated with a gas generator or a stage of a multi-stage generator, for a rapid inflation operation with little energy and thus little aggressiveness.

In an alternative embodiment, at least one feeler airbag is integrally configured in a larger airbag chamber, and can be shaped by the placement of arrester strips. Arrester strips are arranged on wall regions around the rear region of the feeler airbag, as a result of which partial edge regions of the airbag contour are prevented from deploying and initially only the low-volume feeler airbag inflates. These arrester strips are equipped as force-limited burst strips that, after the formation of the feeler airbag, burst as the pressure rises further and thus allow complete deployment of the entire airbag contour with its support function. With this arrangement, a feeler airbag can be configured with only minor additional structured or other modifications for example, a central circular or annular region of a globally approximately spherically inflatable airbag is used to form a feeler airbag.

Formation of the feeler airbag during the inflation phase can advantageously be adapted to and coordinated with individual and vehicle-specific circumstances, in terms of geometry and time sequence, by way of the arrangement, length, and burst characteristics of the arrester strips, and by the provision of throttling flow openings in flexible bulkheads.

Advantageously, in all of the embodiments, the gas inflow into the multi-chamber airbag (at least outside the region of the feeler airbag) is accomplished through at least one diffuser, which is arranged downstream from a gas generator and has radially directed outflows. As a result of a substantially radial inflation direction into the airbag that is thereby achieved, its aggressiveness toward an occupant is reduced. This feature, in combination with the function of the feeler airbag and optionally a modulation of the at least one generator and/or non-firing of a further stage of a staged generator, results in a substantial reduction in the aggressiveness of an airbag arrangement.

In another alternative embodiment for configuring a feeler airbag, at least one, preferably several, finger-like feeler airbags are shaped on the impact surface of at least one principal chamber of an airbag, approximately in the inflation direction directed toward an occupant. The geometry of the arrangement is configured so that at the beginning of the inflation phase, optionally in conjunction with the aforementioned features (bulkheads, burst strips, etc.), one or more feeler airbags are inflated and are moved into the inflation region of the overall contour. In this embodiment, in contrast to the previous embodiment, the finger structure of the feeler airbag does not transition into a spherical overall structure after the bursting of the arrester strips, but rather is substantially retained. To reduce the possible aggressiveness of the free ends of several such feeler airbags, the free ends are connected with a perforated film or a net, so that the impact load is distributed over a surface.

In yet another alternative embodiment for configuring a feeler airbag, a first airbag chamber that is inflatable relatively low down toward a normal position of an occupant is configured as a feeler airbag. If the feeler airbag can be fully inflated without encountering an obstacle, a thorax airbag chamber, adjacent at the top, is inflated at the front region of this first airbag chamber and through it for complete activation and formation of the complete airbag contour. As a result of this multi-chamber system, it is possible with the actions already mentioned above, in simple fashion, to define the geometry of the outer contour in the final position as well as the sequence over time, and to adapt them to individual and vehicle-specific circumstances.

With all the above embodiments of feeler airbags, a tactile recognition function upon encountering an obstacle in the inflation region is necessary.

In a first embodiment of a tactile recognition function, a measurement is performed of the velocity and/or acceleration with which the feeler airbag propagates, and the measurement results are conveyed to a threshold value device. A sudden decrease in this measured value indicates an encounter with an obstacle, and thus the need for modulation of a gas generator and/or non-firing of a further stage of a staged generator.

A plurality of different velocity measurement devices may be used. One particularly simple and functional apparatus for velocity measurement includes a measurement cord having an applied barcode, and a photoelectric barrier with a signal analyzer. The measurement cord is attached to the inner front end of the feeler airbag and, as the feeler airbag propagates, is pulled through the photoelectric barrier and through a cord brake mounted at that point which tensions the measurement cord. The barcode pulled through the photoelectric barrier can be detected instrumentally and yields the pull-through velocity. It is also optionally possible to ascertain an end position of the feeler airbag after which an impact will no longer result in any modulation of a gas generator.

Alternatively or in addition to the velocity sensing device described hereinabove, it is also possible to use for tactile recognition the position of switch contacts that are arranged in a front feeler region of the feeler airbag. Such switch contacts can be opened or closed, depending on their initial position, by a deformation of the feeler airbag upon encountering an obstacle. Preferably, the result is to complete a circuit in order to emit a switch signal. The arrangement can advantageously also be configured to that upon complete deployment of the airbag, the contacts are so far apart from one another that no further mutual contact is possible to complete a circuit.

At least one multi-stage generator, controllable in multiple stages, may be provided to modulate one or more gas generators, a first stage being fired in order to inflate the feeler airbag. In the event of a response by the tactile recognition system, a decision can then be made, by way of a suitable algorithm of the control device, as to whether no further stages, or optionally a reduced number thereof, are fired. A staged generator may also include one non-modulated generator and a controllable generator as the second stage, or vice versa.

Alternatively or in addition to the above measures, upon arrival of a tactile recognition signal, it is also possible to perform a direct intervention on a gas generator that has already fired, preferably by a pyrotechnically actuable sliding panel, a gas inlet opening to the airbag is blocked and at the same time a bypass is opened.

DETAILED DESCRIPTION

Figure 1:
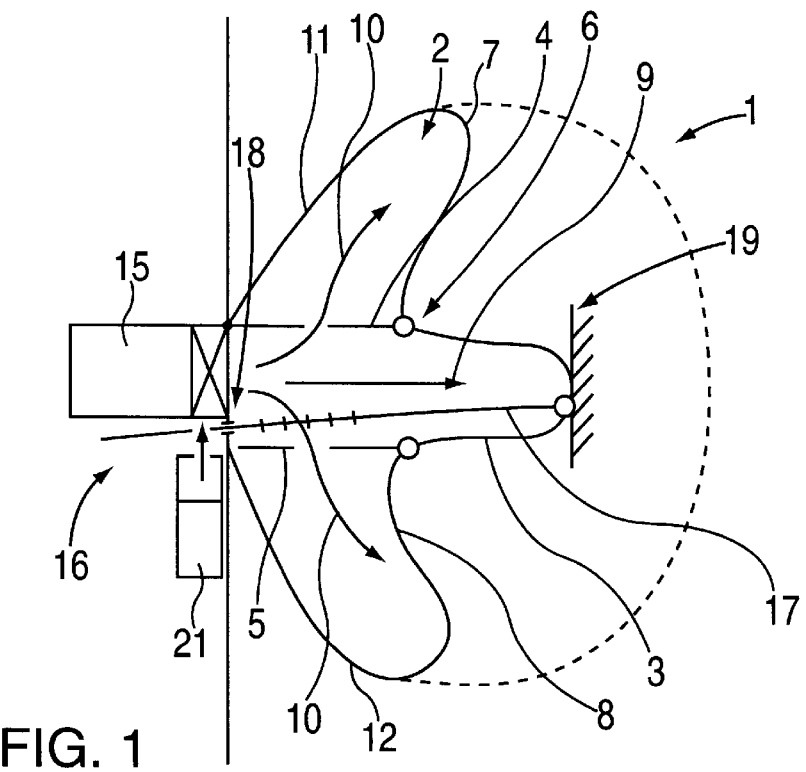
FIG. 1 is a schematic view of a first embodiment of a multi-chamber airbag having a finger-like feeler airbag and a tactile recognition system using a measurement cord.

FIG. 1 schematically illustrates a safety device 1 for a motor vehicle with a multi-chamber airbag 2 that can be activated in the event of a vehicle collision. This multi-chamber airbag 2 is configured such that at the beginning of airbag activation, a finger-like feeler airbag 3 with a tactile function is quickly inflated with little energy.

The formation of feeler airbag 3 is achieved by arrester strips 4, 5 that are mounted, on the one hand, on the vehicle and, on the other hand, on a circular or annular region 6, facing in the inflation direction, of feeler airbag 3. As a result, partial wall regions 7, 8 are prevented from deploying at the beginning of the inflation operation, and feeler airbag 3 is formed.

As shown in FIG. 1, feeler airbag 3 is inflated by an axial gas flow 9, and an annular chamber (lateral airbag chamber portion 11 and lateral airbag chamber portion 12) of multi-chamber airbag 2 is inflated by a radial gas flow 10. The distribution of these gas flows 9, 10 in the axial and radial directions is accomplished by a diffuser that is placed downstream from a single-stage gas generator 15. The principal gas flow is preferably directed in the radial direction, so that feeler airbag 3 is inflated with little energy and little aggressiveness, but quickly because of its relatively small volume.

Also connected to feeler airbag 3 is a tactile recognition apparatus 16 that includes a measurement cord 17 with an applied barcode, a stationary photoelectric barrier 18 associated with measurement cord 17, and a signal analyzer with a threshold value device (not depicted in FIG. 1). Measurement cord 17 is fastened to a front inner end of feeler airbag 3, and upon propagation of feeler airbag 3 is pulled through photoelectric barrier 18 that is mounted in stationary fashion. The velocity at which measurement cord 17 is pulled through is optically sensed and measured by photoelectric barrier 18 by the barcode being pulled past the photoelectric barrier 18. A cord brake (not depicted in FIG. 1) is attached to ensure a specific and relatively low cord tension in the region of photoelectric barrier 18.

In the event of a vehicle collision, if feeler airbag 3 encounters an out-of-position vehicle occupant as an obstacle 19, the propagation velocity of feeler airbag 3 and thus of measurement cord 17 is suddenly greatly reduced. This reduction in the propagation velocity of measurement cord 17 is sensed via photoelectric barrier 18 by the signal analyzer. If the velocity and/or acceleration fall below a predefined setpoint the signal analyzer, emits a control signal to a pyrotechnic element 21. The result of this control signal is that pyrotechnic element 21 activates an attached sliding panel, which blocks off the gas inlet opening from gas generator 15 into multi-chamber airbag 2, and thereby prevents further inflation of multi-chamber airbag 2. Simultaneously with the advance of the sliding panel, a bypass is opened to allow outflow of the gas from the gas generator that has already fired. The result is to prevent injury to an out-of-position occupant, since inflation of multi-chamber airbag 2 into its final position (shown with dashed lines in FIG. 1) does not occur.

In order for multi-chamber airbag 2 to be able to inflate into its spherical final position (shown with dashed lines) if no obstacle is present in the inflation region, arrester strips 4, 5 have a force-limited defined break point. Once feeler airbag 3 has formed, a further increase in pressure due to inflowing gas causes arrester strips 4, 5 to burst, thus permitting deployment of the entire airbag chamber. Arrester strips 4, 5 are configured as flexible bulkheads with flowthrough openings and, as a result, before bursting, have a throttling effect between the gas flowing directly into feeler airbag 3 for rapid formation and the adjacent lateral airbag chamber portions 11, 12.

Figure 2:
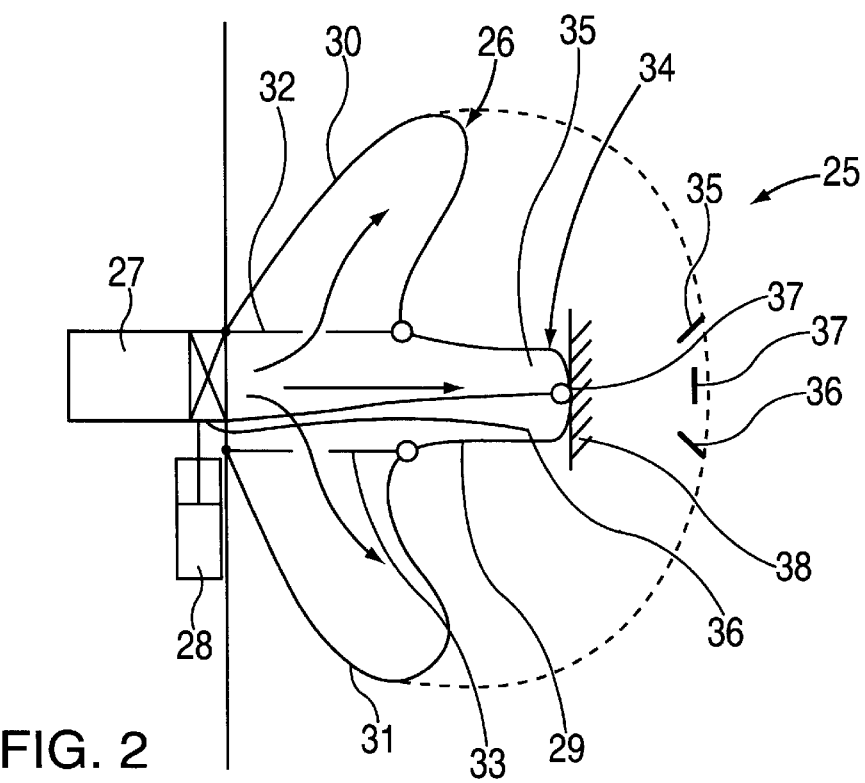
FIG. 2 is a schematic view of a second embodiment of a multi-chamber airbag having switch contacts fro tactile recognition arranged in the region of a feeler airbag.

FIG. 2 schematically illustrates a second embodiment of a safety device 25 for a motor vehicle having a multi-chamber airbag 26. This safety device 25 has substantially the same configuration as safety device 1 illustrated in FIG. 1. As a result of the arrangement of arrester strips 32, 33 and in a manner analogous to the embodiment of FIG. 1, multi-chamber airbag 26, activatable by a gas generator 27, forms at the beginning of the airbag activation process a feeler airbag 29 and an annular chamber with an airbag chamber portion 30 and airbag chamber portion 31 as depicted.

This safety device 25 furthermore includes a tactile recognition apparatus 34 that is made up of switch contacts 35, 36, 37, of which switch contact 37 is arranged on a front inner end of feeler airbag 29 and the other two switch contacts 35, 36 are arranged opposite one another on end-located side regions of feeler airbag 29. Switch contacts 35, 36 can also be elements of a contact ring. If feeler airbag 29 encounters an out-of-position vehicle occupant constituting an obstacle 38, switch contacts 35, 36, 37 change their positions relative to one another, and switch contact 37 comes into contact with switching contacts 35 and 36, thereby completing a circuit. As a result, a control signal is emitted to a control device, which triggers a pyrotechnic element 28. This pyrotechnic element 28 then activates a sliding panel, which corresponds to the embodiment of FIG. 1 and which blocks off a gas inlet opening into multi-chamber airbag 26, a bypass for gas outflow simultaneously being opened. It is also possible to use as the switch contacts a switching wire or switching film, which detach or optionally close in order to make contact when an obstacle is encountered.

Again, arrester strips 32, 33 burst in response to a further increase in pressure resulting from inflowing gas, thus allowing deployment of the entire airbag chamber. In the final position of multi-chamber airbag 26, shown with dashed lines in FIG. 2, switch contacts 35, 36, 37 are so far away from one another that no further contact resulting in completion of a circuit, and thus (in correctly functioning fashion) no further modulation of generator 27, is possible.

Figure 3:
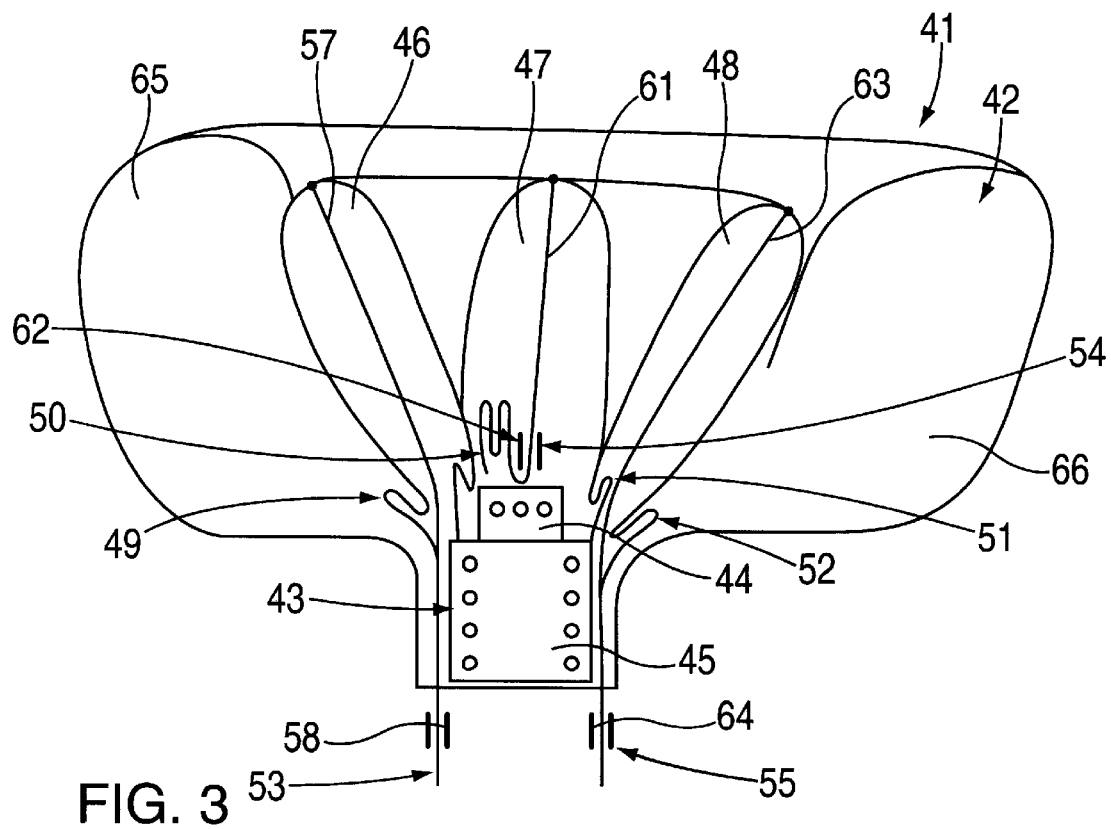
FIG. 3 is a schematic view of a third embodiment of a multi-chamber airbag having several feeler airbags.

FIG. 3 schematically illustrates a third embodiment of a safety device 41 for a multi-chamber airbag 42. This safety device 41 includes a multi-stage generator 43 which has a first gas generator stage 44 and a second gas generator stage 45.

At the beginning of an inflation operation of multi-chamber airbag 42 in the event of a vehicle collision, first gas generator stage 44 is fired after opening of an airbag cover (not depicted here), causing finger-like feeler airbags 46, 47, 48 to be inflated at relatively low energy and with a relatively small volume. The finger-like configuration of feeler airbags 46, 47, 48 can be achieved, by analogy with the embodiments of FIG. 1 and FIG. 2, by arrester strips 49, 50, 51, 52 arranged in the region of multi-stage generator 43 in conjunction with wall folds, portions of the airbag walls thereby initially being held back.

Feeler airbags 46 and 48 each point in a lateral direction, so that out-of-position occupants and objects that may be located in those directions may be detected. As depicted, the free ends of feeler airbags 46, 47, 48 can be joined by a film or a net. Feeler airbags 46, 48 as depicted may be elements of a circular ring chamber.

A tactile recognition apparatus 53, 54, 55 is associated with each of these feeler airbags 46, 47, 48. Tactile recognition apparatus 53 of feeler airbag 46 includes a measurement cord 57 with an applied barcode, a stationary photoelectric barrier 58 associated with this measurement cord 57, and a signal analyzer with a threshold value device (not depicted here). Measurement cord 57 is fastened to a front inner end of feeler airbag 46, and upon propagation of feeler airbag 46 is pulled past photoelectric barrier 58 that is mounted in stationary fashion. Tactile recognition apparatus 54 of feeler airbag 47 with a measurement cord 61 and a stationary photoelectric barrier 62, and tactile recognition apparatus 55 of feeler airbag 48 with a measurement cord 63 and a stationary photoelectric barrier 64, are similarly configured.

During the inflation of feeler airbags 46, 47, and 48, the measurement cords 57, 61, 63 are tensioned at a relatively low cord tension by cord brakes mounted in the vicinity of photoelectric barriers 58, 62, 64, so that the velocity at which they are pulled through may be optically sensed and measured by the barcode that is being pulled past. If the pull-out velocities of measurement cords 57, 61, 63 decrease, for example, when one or more of feeler airbags 46, 47, 48 encounters an out-of-position vehicle occupant, a control signal is emitted to a gas generator control device, by respective threshold device of the signal analyzer, when the velocity and/or acceleration fall below a predefined setpoint. The gas generator control device then does not trigger second gas generator stage 45, so that no further inflation of multi-chamber airbag 42 occurs.

Feeler airbags 46, 47, 48 have a high propagation velocity with relatively little energy. It is thereby possible to detect, for example, occupants or child seats with relatively little impact even in an oblique direction from feeler airbags 46, 47, 48, i.e., in out-of-position locations.

In the event that no vehicle occupants are in out-of-position locations, the pull-out velocity of measurement cords 57, 61, 63 does not decrease until the defined break points of arrester strips 49, 50, 51, 52, are reached. The control signal then delivered to the gas generator control device causes firing of second gas generator 45, which then further inflates airbag chambers 65, 66 as well as feeler airbags 46, 47, 48, as a result of which arrester strips 49, 50, 51, 52 burst apart and multi-chamber airbag 42 assumes its final position.

Safety device 41 illustrated in FIG. 3 may also be operated with a single-stage gas generator and a suitably configured diffuser. With a single-stage gas generator, corresponding to the embodiments of FIGS. 1 and 2, further inflation illustrated in multi-chamber airbag 42 would then, in the event of a sudden decrease in the pull-out velocity of measurement cords 57, 61, 63, be modulated by a pyrotechnic element. For example, the gas inlet openings into multi-chamber airbag 42 would be closed and bypasses for gas outflow would simultaneously be opened.

Figure 4:
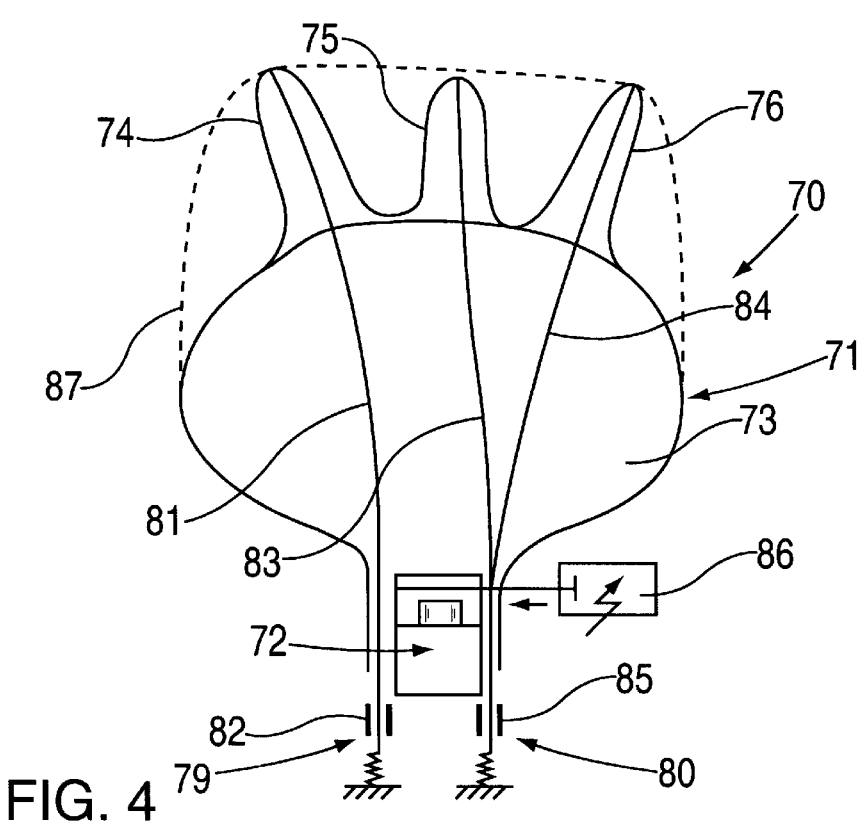
FIG. 4 is a schematic view of a fourth embodiment of a multi-chamber airbag having three inflatable finger-like feeler airbags.

FIG. 4 schematically illustrates another embodiment of a safety device 70 with a multi-chamber airbag 71. This safety device 70 includes a single-stage gas generator 72 with which multi-chamber airbag 71 can be inflated. As illustrated in FIG. 4, at the beginning of the inflation operation upon activation of multi-chamber airbag 71, three finger-like feeler airbags 74, 75, 76 are extruded on an impact surface of a principal chamber 73, directed approximately in the inflation direction, and are inflated together at the beginning of the inflation phase, governed by the corresponding airbag geometry.

Safety device 70 includes a first tactile recognition apparatus 79 for feeler airbag 74, with a measurement cord 81 having an applied barcode and with a stationary photoelectric barrier, with signal analyzer, associated with the measurement cord 81. Safety device 70 furthermore includes a second tactile recognition device 80 for feeler airbags 75 and 76 which includes a first measurement cord 83 for feeler airbag 75 and a second measurement cord 84 for feeler airbag 76. A stationary photoelectric barrier 85 with a signal analyzer is associated with these measurement cords 83, 84.

A cord brake is mounted in the region of the photoelectric barrier for a relatively low cord tension, so that the barcode of measurement cords 81, 83, 84 can easily be optically sensed and measured as it is pulled past photoelectric barrier 82, 85.

Feeler airbags 74, 75, 76 scan the area in front of principal chamber 73 with relatively little energy, and by way of their measurement cords 81, 83, 84 and the signal analyzer associated with photoelectric barriers 82, 85, as a result of the sudden reduction in pull-out velocity deliver a signal to a pyrotechnic element 86 upon encountering an out-of-position vehicle occupant. This pyrotechnic element 86 stops further gas delivery into multi-chamber airbag 71 by a sliding panel that can be slid in front of the gas inlet opening, thus considerably reducing the aggressiveness of multi-chamber airbag 71 for an out-of-position vehicle occupant.

As illustrated in FIG. 4 with dashed lines, the free ends of feeler airbags 74, 75, 76 are connected by a net 87 or a perforated film in order to reduce local finger aggressiveness.

Figure 5:
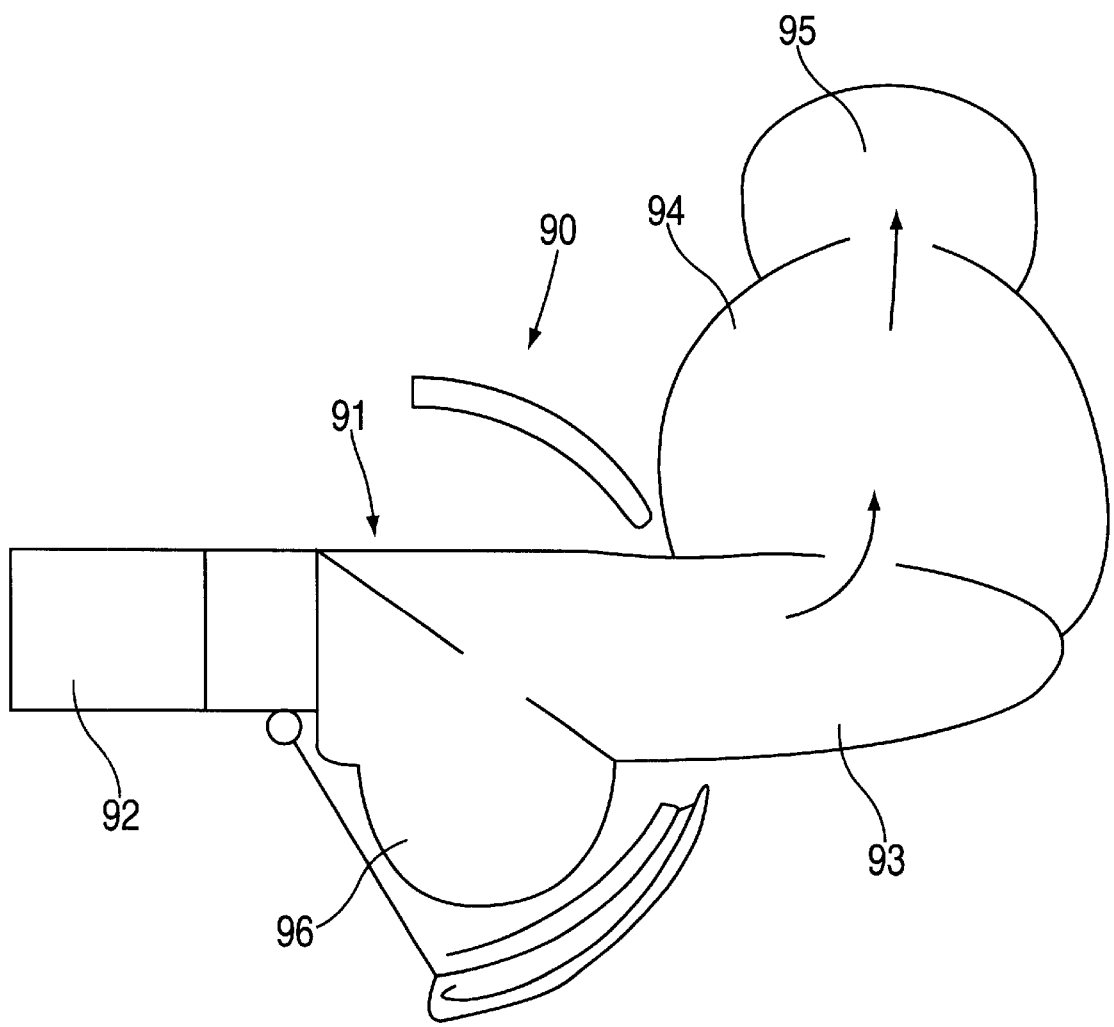
FIG. 5 is a schematic view of a fifth embodiment of a multi-chamber airbag having a thorax airbag chamber and a head airbag chamber.

FIG. 5 schematically illustrates yet another embodiment of a safety device 90 with a multi-chamber airbag 91 in the form of a four-chamber airbag. With this safety device 90, which has a single- or multi-stage gas generator 92, in the event of a vehicle collision, initially a first airbag gas chamber 96 is activated to open the cover and a second airbag chamber is activated as a feeler airbag 93 which is inflated in a lower region in the direction of a normal position of an occupant. If a vehicle occupant is in an out-of-position location inside the vehicle, then similar to the previously described embodiments illustrated in FIGS. 1 through 4, it is possible to stop gas delivery, and thus stop aggressive complete inflation of multi-chamber airbag 91, by modulation of gas generator 92 or by activation of a pyrotechnic element.

If the vehicle occupant is in a normal position inside the vehicle, i.e., not out of position, and if no further obstacle is detected, multi-chamber airbag 91 can be completely inflated. A further thorax airbag chamber 94, adjacent to the top of the front region of feeler airbag 93, is inflated through feeler airbag 93, and then a head airbag chamber 95, adjacent to thorax airbag chamber 94, is inflated through feeler airbag 93 and thorax airbag chamber 94.

What is claimed is:

1. A safety device for a motor vehicle, comprising:
    at least one gas generator that is activatable in response to a vehicle collision;
    a multi-chamber airbag that is inflatable by the gas generator;
    a tactile recognition device connected to the multi-chamber airbag, the tactile recognition device emitting a control signal in response to contact of the multi-chamber airbag with an obstacle, the control signal being analyzable at least during an airbag inflation phase; and
    a control device configured to control a gas volume flow into the multi-chamber airbag, the control device being associated with the gas generator and connected to the tactile recognition system, the control device at least one of suppressing and reducing a further inflation function of the gas generator for the multi-chamber airbag in response to receiving the control signal;
    wherein the multi-chamber airbag includes at least one finger-like feeler airbag having a relatively low volume and being rapidly inflatable with little energy and at least one second, larger-volume airbag chamber having a support function, each feeler airbag having a tactile function, each feeler airbag being at least one of inflatable and movable into an inflation region of the second airbag chamber, each feeler airbag being configured to sense the obstacle present in the inflation region.

2. The safety device according to claim 1, wherein the obstacle is an out-of-position occupant.

3. The safety device according to claim 1, wherein each feeler airbag is a separate chamber of the multi-chamber airbag and is inflatable earlier in time than the second airbag chamber.

4. The safety device according to claim 1, wherein at least one of the feeler airbags is formed on an impact surface of at least one second airbag chamber, the feeler airbags extending approximately in an inflation direction, the feeler airbags being inflated together and by corresponding geometry substantially at a beginning of an inflation phase.

5. The safety device according to claim 4, wherein a plurality of feeler airbags are formed on the impact surface.

6. The safety device according to claim 5, further comprising one of a perforated film and a net connecting free ends of the feeler airbags.

7. The safety device according to claim 1, wherein the second airbag chamber includes a thorax airbag chamber adjacent to a top of a front region of the feeler airbag and a head airbag chamber adjacent to the thorax airbag chamber, the feeler airbag chamber being disposed relatively lower in a direction of a normal position of an occupant, the thorax airbag chamber being inflatable through the feeler airbag.

8. The safety device according to claim 1, wherein the tactile recognition device includes an apparatus for measuring at least one of a velocity and an acceleration of a propagation of the feeler airbag and a threshold value device, the threshold value device emitting the control signal when the at least one of a velocity and an acceleration falls below a predefined setpoint.

* * * * *